United States Patent Office 2,770,540
Patented Nov. 13, 1956

---

2,770,540

LIQUID FERTILIZERS

Donald E. Vierling, Pittsburgh, Pa.

No Drawing. Application June 19, 1953,
Serial No. 362,943

2 Claims. (Cl. 71—43)

This invention relates to compositions of matter which are intended to assist plant growth, and more particularly to liquid fertilizers.

It is, of course, well known that nitrogen (N), phosphoric pentoxide ($P_2O_5$), and potassium oxide ($K_2O$) are nutrients to plant life, and such have, for many years, been widely used in dry fertilizers. More recently, these nutrients have become available in fertilizers which are furnished to the trade in liquid form, usually as a concentrate for subsequent dilution in water.

Recent surveys show that most users of fertilizers much prefer that it be furnished to them in liquid form, thereby eliminating any necessity for their having to make up solutions from solid particulate form, with its attendant disadvantages.

It is accordingly one of the objectives of the present invention to provide a much improved fertilizer which may be furnished to the trade in liquid form, whether or not as a concentrate for subsequent dilution in water.

I have further discovered that liquid fertilizers made from free ammonia have numerous advantages from the manufacturing standpoint; and, when supplemented by a wetting agent in truly effective quantities, they are absorbed by the plants in tremendously increased manner, thereby practically eliminating any possibility of leeching, evaporation or any other form of loss. Therefore, to all intents and purposes, the plant obtains the complete value of the nutrients of the improved liquid fertilizer of the present invention.

Referring to the manufacturing standpoint, I have further discovered that, when liquid fertilizers are made from anhydrous ammonia, and employing the following procedure, they are much cheaper to manufacture than are liquid fertilizers made by standard procedures, or any other procedure now known to me; and also that, when so manufactured, they have decided insecticidal value:

1. Add water to obtain the desired solutions; for example, approximately 40% of water is employed to obtain an 8–8–8 liquid fertilizer.

2. Add potassium hydroxide (KOH) to the water to obtain desired percent of potassium oxide ($K_2O$) in the final composition; for example, 8% $K_2O$ by weight.

3. Neutralize KOH with nitric acid ($HNO_3$) to obtain a pH value of 7.0.

4. Add phosphorus acid ($H_3PO_4$) to obtain the desired percent of phosphorus pentoxide ($P_2O_5$); for example, 8% $P_2O_5$ by weight.

5. Neutralize $H_3PO_4$ with ammonia ($NH_3$) by bubbling the $NH_3$ into the aqueous solution; or, as an alternative, prepare the desired aqueous ammonia solution and add it to the acid solution.

6. Add the desired nitrogen content (considering the nitrogen already added by the $HNO_3$ to neutralize the KOH, and the $NH_3$ added to neutralize the $H_3PO_4$) by adding equal molecular weights of $NH_3$ (bubbling it in) and $HNO_3$ to obtain the desired percent of nitrogen; for example, 8% by weight.

7. Add effective quantities of a standard wetting agent; for example 0.05% by weight.

8. Add the following desired trace elements:

| | |
|---|---|
| Manganene sulphate | Cobalt sulphate |
| Boric acid | Iron sulphate |
| Copper sulphate | Sodium molybdate |
| Zinc sulphate | Magnesium sulphate |

Other water soluble trace elements may, of course, be used to supply various soil deficiencies.

The aforementioned standard wetting, or surface active, agent may be selected from the anionic or nonionic, the following ones have proved to be effective in obtaining the benefits of the teachings of the present invention:

| | |
|---|---|
| Ultra Wet | Triton X–100 |
| Santomeres | Super Wet LD |
| Naconal | Dupanol |
| Oronite D–140 | |

From the foregoing, it is believed manifest that a number of water soluble compounds will provide the nutrient solutions.

The present invention contemplates nitrogen (N), phosphoric pentoxide ($P_2O_5$) and potassium oxide ($K_2O$) in substantially equal weight ratios, such as 8–8–8; of completely water soluble nutrients at least 15% by weight; and the wetting, or surface active, agent (for example Ultra Wet) present to the extent of ten pounds per ton of liquid fertilizer.

It is recognized that small quantities of wetting agents have heretofore been used in dry fertilizers to prevent caking, decrease the drying time, etc. However, the liquid fertilizer of the present invention contemplates the presence of a wetting agent to a vastly greater extent, and, in any event, not less than ¼% in the mixture as applied to the plants, its purpose being to enable the immediate absorption of the nutrients and other chemicals by the plant, as previously stated.

The anhydrous ammonia provides the nitrogen in a readily available form so that it can be used direct, or is easily converted by the plant to the nitride, and used as a plant nutrient.

The liquid fertilizer of the present invention has been found to serve as a very effective vehicle for additional water soluble agricultural chemicals generally used in agriculture, such as weed killer, soil conditioners, sequestering agents, vitamins, penicillin and anti-biotics.

In hard water areas, some difficulty with the solubility of certain of the agricultural chemicals might be expected. However, I have discovered that, along with the wetting agent, and preferably in equal proportions therewith to obtain the aforementioned total percentages, any one of the well known sequestering agents (for example, of the polyphosphate variety) not only improves solubility, but actually aids in improved biological activity.

While I have shown and described certain specific embodiments of the present invention, it will be readily understood that I do not wish to be limited exactly thereto, since various modifications may be made without departing from the scope of the invention as defined in the appended claims.

I claim:

1. The method of manufacturing a liquid fertilizer which includes adding to water sufficient potassium hydroxide to obtain the desired percentage of potassium oxide, neutralizing the potassium hydroxide with nitric acid, adding sufficient phosphoric acid to obtain the desired percentage of phosphoric pentoxide, neutralizing the phosphoric acid with ammonia, and adding equal molecular weights of ammonia and nitric acid to obtain the desired percentage of nitrogen.

2. The method of manufacturing a liquid fertilizer which includes adding to water sufficient potassium hydroxide to obtain the desired percentage of potassium oxide, neutralizing the potassium hydroxide with nitric acid to obtain a pH value of 7.0, adding sufficient phosphoric acid to obtain the desired percentage of phosphoric pentoxide, neutralizing the phosphoric acid with ammonia, adding equal molecular weights of ammonia and nitric acid to obtain the desired percentage of nitrogen, and adding a wetting agent.

References Cited in the file of this patent

UNITED STATES PATENTS

| | | |
|---|---|---|
| 1,949,715 | Johannes | Mar. 6, 1934 |
| 1,999,026 | Tramm et al. | Apr. 23, 1935 |
| 2,020,824 | De Bruyn | Nov. 12, 1935 |
| 2,218,695 | Leatherman | Oct. 22, 1940 |
| 2,280,451 | Biddle | Apr. 21, 1942 |
| 2,284,002 | Lontz | May 26, 1942 |
| 2,314,091 | Jones | Mar. 16, 1943 |
| 2,350,982 | Borst | June 13, 1944 |
| 2,614,040 | Kaikinger | Oct. 14, 1952 |